(12) United States Patent
Van Der Staay

(10) Patent No.: US 6,425,355 B1
(45) Date of Patent: Jul. 30, 2002

(54) METHOD FOR IDENTIFYING MISFIRINGS IN A PISTON INTERNAL COMBUSTION ENGINE

(75) Inventor: Frank Van Der Staay, Würselen (DE)

(73) Assignee: FEV Motorentechnik GmbH, Aachen (DE)

( * ) Notice: Subject to any disclaimer, the term of this patent is extended or adjusted under 35 U.S.C. 154(b) by 0 days.

(21) Appl. No.: 09/644,538

(22) PCT Filed: Dec. 17, 1999

(86) PCT No.: PCT/EP99/10041

§ 371 (c)(1),
(2), (4) Date: Aug. 24, 2000

(87) PCT Pub. No.: WO00/39555

PCT Pub. Date: Jul. 6, 2000

(30) Foreign Application Priority Data

Dec. 24, 1998 (DE) .......................................... 198 60 197

(51) Int. Cl.⁷ ............................. F01L 9/04; F02D 41/00; G01M 15/00
(52) U.S. Cl. ................................... 123/90.11; 73/117.3
(58) Field of Search ........................ 123/90.11; 73/116, 73/117.3

(56) References Cited

U.S. PATENT DOCUMENTS

| | | | | |
|---|---|---|---|---|
| 5,197,325 A | * | 3/1993 | Tamura et al. | 73/117.3 |
| 5,383,350 A | * | 1/1995 | Bennett et al. | 73/35.01 |
| 5,636,601 A | * | 6/1997 | Moriya et al. | 123/90.11 |

FOREIGN PATENT DOCUMENTS

| | | |
|---|---|---|
| DE | 37 33 704 | 4/1988 |
| DE | 197 23 563 | 12/1998 |

* cited by examiner

*Primary Examiner*—Weilun Lo
(74) *Attorney, Agent, or Firm*—Venable; Norman N. Kunitz

(57) ABSTRACT

A method for recognizing misfires in a piston-type internal-combustion engine with spark ignition and an engine control unit (ECU) for actuating electromagnetic actuators to operate the cylinder valves. The time difference between the opening time preset by the engine control unit and the actual opening time of an exhaust valve is detected as the actual value, then compared to a preset tolerance-time difference as the nominal value, and a signal is generated if this nominal value is not met, i.e., the nominal value exceeds the actual value.

5 Claims, 3 Drawing Sheets

METHOD FOR IDENTIFYING MISFIRINGS IN A PISTON INTERNAL COMBUSTION ENGINE

BACKGROUND OF THE INVENTION

The invention relates to a method for recognizing misfires in a piston-type internal-combustion engine having spark ignition, and an engine timing for actuating electromagnetic actuators to operate the cylinder valves, which respectively have an electrical opening magnet and an electrical closing magnet.

In piston-type internal-combustion engines having spark ignition, so-called SI engines, high requirements are placed on a so-called on-board diagnosis, particularly if the engines are installed in motor vehicles. One such requirement is the recognition of misfires. The conversion of this type of diagnosis was previously based on an analysis of the uniformity of rotation supported by signals picked up from the crankshaft. This signal detection is not precise enough, however, because in a motor vehicle in particular, the rotation uniformity of the crankshaft is not only a function of anomalies in the combustion process, but road bumps are other disturbance factors that exert an influence.

According to another method, an ion-current measurement was performed at the spark plug, and the obtained values were used for the analysis. The combustion processes can be detected directly in the cylinder with this method. The drawback, however, is that each spark plug must be provided with a corresponding measuring electrode, and a dedicated measuring circuit must be present.

SUMMARY OF THE INVENTION

It is the object of the invention to create a method that is sufficiently reliable for directly deriving the signals from the combustion processes in the cylinder, on the one hand, and on the other hand, requires no separate measuring circuit.

According to the invention, this object is accomplished for piston-type internal-combustion engines of the type mentioned at the outset in that the time difference between the opening time preset by the engine timing and the actual opening time of an exhaust valve is detected as the actual value, then compared to a preset tolerance-time difference as the nominal value; a signal is generated if this nominal value is not met. This method advantageously makes use of the fact that, in normal combustion, the pressure course of the internal cylinder pressure differs significantly from the pressure course of a combustion misfire. Because the internal cylinder pressure, as a friction value, influences the valve stroke of the electromagnetic actuator embodied as a spring-mass oscillating system for operating the gas-exhaust valve, an evaluation of the valve stroke movement starting from the "exhaust open" control edge of the engine timing yields a statement about whether combustion has occurred.

To open the gas-exhaust valve, the engine control unit (ECU) cuts off the current to the electrical closing magnet at a preset time, so the prestressed opening spring associated with the closing magnet moves the cylinder valve in the opening direction. In a normal combustion process, at the beginning of the exhaust stroke, a correspondingly high internal cylinder pressure builds up in the combustion chamber; the opening spring must overcome this pressure when the valve begins to open, so a corresponding delay occurs between the cutoff of the current to the closing magnet and the beginning of the opening movement of the valve.

If, however, a misfire prevents combustion, a correspondingly lower internal cylinder pressure is present at the beginning of the exhaust stroke, so the opening spring successfully opens the cylinder valve notably earlier. Because the engine control unit, which also actuates the electromagnetic actuators of the individual valves, builds up a plurality of control signals on time-based dependencies, it is thus possible, within the scope of the engine control unit, to use the detection of the time difference as the actual value in a normal combustion process, and, if this actual value is not met in the event of a misfire, to generate a corresponding signal that is detected in an "error management" within the scope of the on-board diagnosis device in the event of misfires, which occur sporadically anyway. Depending on the embodiment, when a preset number of ascertained misfires is not met within a predetermined time span, the on-board diagnosis device releases a corresponding error signal, for example through a signal light on the dashboard.

The method can be modified in a first embodiment in that at least one sensor, which is associated with a movable part of the electromagnetic actuator connected to the exhaust valve, detects the actual beginning of motion or displacement of the gas-exhaust valve during the opening stroke. With this method, the information regarding whether combustion has to take place can be read as a functioning time, directly from the path course of the opening gas-exhaust valve. If the current supply to the closing magnet of the electromagnetic actuator has been cut off, the moving part of the gas-exhaust valve is delayed. This is due to the fact that the gas-exhaust valve cannot open until a pressure level that is defined by the deflection of the opening spring and the valve size, and the internal cylinder pressure, is attained. This delay time can be detected directly as the actual value by a corresponding sensor at the electromagnetic actuator.

The path course of the exhaust valve as a function of time is further influenced by delay times occurring during the flight time. These delays result essentially from counterforces arising from the out-flowing gas during the movement acting on the valve. If the definitive delay between the cutoff of the retaining current at the closing magnet and the start of movement of the gas-exhaust valve is determined for a normal combustion process as a function of the control time and an assumed internal cylinder pressure, then the actual value derived from the delay times in a normal combustion process cannot fall below a preset limit value. If this is the case, however, a misfire has occurred. The required sensor, as a high-resolution path sensor, e.g., an eddy-current sensor, is advantageously disposed at the actuator, and detects, for example, the movement of the guide rod of the actuator armature. A path sensor of this type can be provided at an actuator for regulating the impact speed of the armature against the pole faces of the magnets. The actual value that is read off for recognizing misfires does not, however, interfere with the current regulation by the engine control unit for actuator operation, because the detection of the actual value for this diagnosis is performed over the first half of the valve movement, while the regulation of the current supply of the capturing opening magnet is effected during the second half of the valve movement, and thus also of the armature movement.

In another embodiment of the method according to the invention, it is provided that the change in the course of the voltage at the closing magnet of the actuator of the gas-exhaust valve is detected as a function of time after the retaining current has been cut off, and if a preset minimum value is exceeded, a signal is released. This method utilizes the fact that, after the retaining current is cut off at the closing magnet, the voltage sinks initially, but rises again due to electro-inductive processes when the armature releases from the pole face of the closing magnet and begins to move. At a higher cylinder pressure, as is the case during a normal combustion process, this release process takes place more slowly. The maximum of this rise is thereby shifted by a corresponding time span. The delayed release of the armature from the pole face also causes interim changes in the field conditions such that the residual voltage in the coil of the closing magnet drops again, and the voltage increase is therefore relatively small. If, however, the internal cylinder pressure is lower due to a misfire, the armature can be released from the pole face earlier and at a higher speed, so the maximum of the voltage increase is attained earlier, on the one hand, and a higher value is attained, on the other hand. Again, a corresponding signal can be derived from the ascertainable voltage difference.

The method according to the invention possesses the advantages of a highly-dynamic recognition of misfires, i.e., the misfires can be detected according to individual cycles. A further advantage of the method is that no additional sensor is required; the sensors present anyway at the actuators can be used to regulate the impact speed, or the values for the voltage course, which can be detected in the engine control unit anyway, can be used. A further advantage is that the method of the invention can be used in I-cycle methods, that is, when the engine control unit deactivates individual cylinders under predeterminable conditions. This is effected by the cutoff of the fuel supply to the cylinder, and the cutoff of the ignition, so the piston-type internal-combustion engine operates with a reduced number of cylinders. In this mode, the rotation uniformity is correspondingly high, so this factor can no longer be used to recognize misfires. The method can also be used with highly-dynamic load increases. The signal detection must be performed anyway for a valve-failure diagnosis, and/or for current regulation, so the occurring signals can be additionally evaluated within the computer of the electronic engine timing.

BRIEF DESCRIPTION OF THE DRAWINGS

The invention is described below in conjunction with schematic drawings and diagrams. Shown are in:

FIG. 1 schematically illustrates a cylinder Z of a piston-type internal-combustion engine having spark ignition. The piston K is located in the region of the lower dead-center position shortly before the opening of the exhaust-gas valve 1. The exhaust valve 1, which is likewise schematically illustrated, is operated via an electromagnetic actuator 2. The electromagnetic actuator 2 essentially comprises a closing magnet 3 and an opening magnet 4. The two electromagnets 3, 4 are disposed with spacing from one another, so an armature 6 secured to a guide rod 5 can move between them, counter to the force of restoring springs 7 and 8. The restoring spring 7 serves as an opening spring, and the restoring spring 8 serves as a closing spring, for the cylinder valve 1. An engine control unit (ECU) 9 supplies the closing magnet 3 and opening magnet 4 with current, corresponding to the desired load, which can be preset by an indicated gas pedal 10. In the engine control unit 9, the engine rpm n and the crank position, which are required for actuating the electromagnetic actuators of the cylinder valves, the ignition, the fuel supply, etc., are detected in addition to a plurality of other measurement data.

Figure 1:
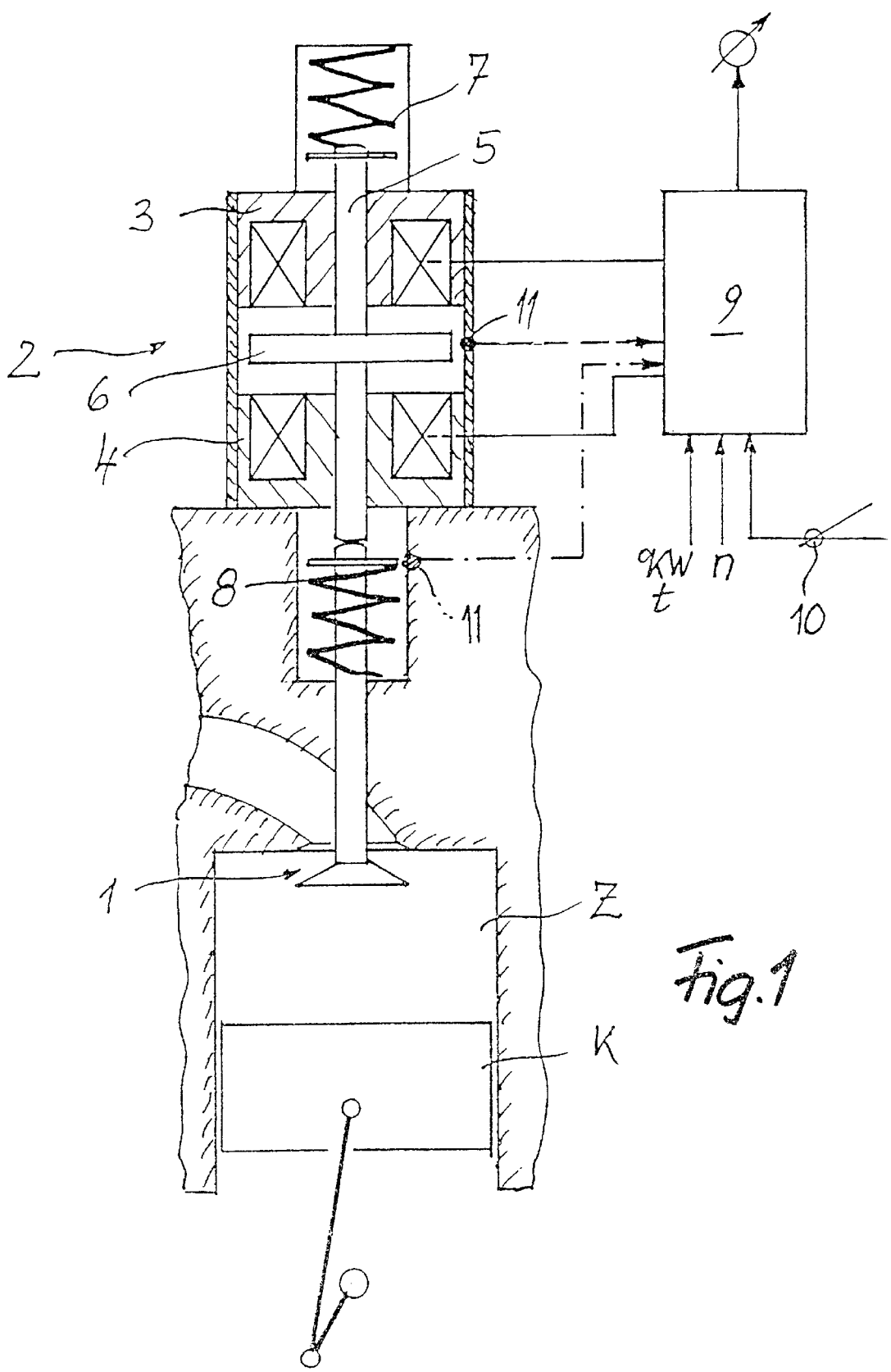
FIG. 1 schematically shows an electromagnetically-actuated cylinder valve (exhaust valve) of a piston-type internal-combustion engine.

Furthermore, the electromagnetic actuator 2 can be connected to at least one sensor 11, which can read off the movement of the cylinder valve, for example in the region of the armature 6, or above the closing magnet from the guide rod 5 of the armature 6, or directly at the stem of the cylinder valve 1, as indicated in FIG. 1.

Figure 2:
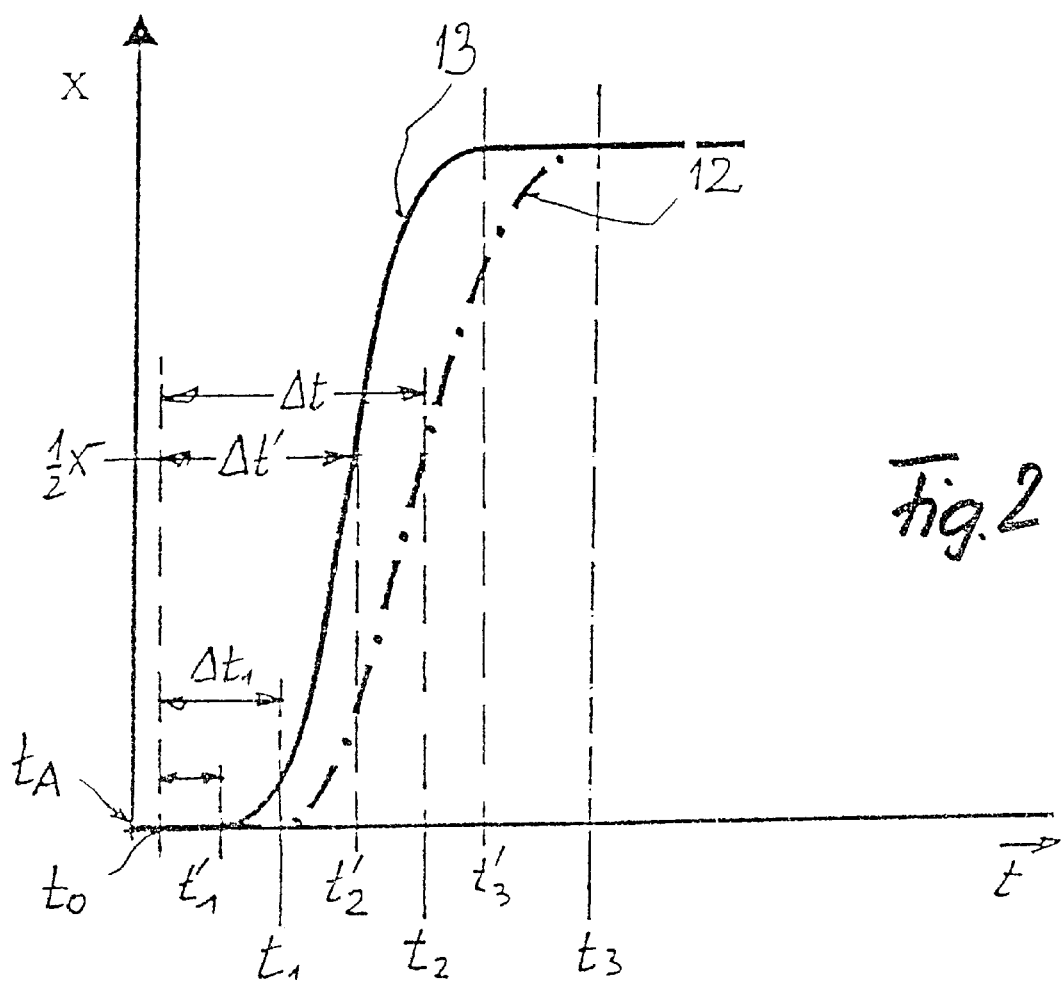
FIG. 2 illustrates the course of movement of the exhaust valve during opening.

FIG. 2 schematically illustrates the course of the movement of the exhaust valve during the opening process. The dot-dash curve 12 illustrates the course of movement during normal combustion, while the solid-line curve 13 represents the course of movement in the event of a misfire.

After the engine control unit has cut off the retaining current to the closing magnet 3 at the time $t_A$, the residual field of the closing magnet is weakened at the time $t_0$ until the opening spring 7 can move the armature 6 with the cylinder valve 1. The time $t_A$–$t_0$ essentially corresponds to the so-called sticking time.

As can be seen from the curve 12 for a normal combustion process, the armature 6 releases from the pole face of the closing magnet 3 at a time $t_1$. At the time $t_2$, the gas-exhaust valve has traversed one-half of the opening path, and is completely open at the time $t_3$. At this time, the armature 6 rests against the pole face of the opening magnet 4.

The time $t_2$ can be detected by the sensor 11 illustrated in FIG. 1; as described above, the sensor need not be associated with the armature 6, but can also be associated with the guide rod 5, for example.

As can be seen from the course of the curve 13, when a misfire occurs due to the conditions described at the outset, the armature 6 release from the pole face of the closing magnet 3 at an earlier time $t'_1$. One-half of the opening path has been traversed at the correspondingly earlier time $t'_2$, and the open position has likewise been attained at the earlier time $t'_3$.

As can be seen from a comparison of the two curves 12 and 13, the movement of the gas-exhaust valve is slowed less during the opening process by the countereffect of the gas flow when a misfire occurs, so the armature speed is significantly higher after one-half of the stroke path has been traversed, and one-half of the stroke path is traversed at an earlier time $t'_2$. Because the electrical, electromagnetic and mechanical-dynamic properties of the actuator and the flow influences are sufficiently known, the beginning of the movement at the time $t_1$ or the passage of the center position at the time $t_2$ is also a value that is known with the required precision. The time difference $\Delta t_1$ between $t_0$ and $t_2$, and/or the time difference $\Delta t_2$ between $t_0$ and $t_2$, is or are known, and can be implemented as the nominal value for the method.

If a misfire occurs, the sensor 11 detects the beginning of movement or the passage through the center position at the time $t'_1$ or $t'_2$, respectively. The time difference $\Delta't_1$ between $t_0$ and $t'_1$ or $\Delta't_2$ between $t_0$ and $t'_2$ is then correspondingly shorter due to the other, above-described pressure and flow conditions. These shorter time differences $\Delta t'$ can then be implemented as the actual value.

Because the motorized operation is not always consistent, even in a normal combustion process, the time differences $\Delta t$ vary slightly, whether with respect to the actual beginning of the opening, or the passage through the center position, so a lower limit value must be preset for the nominal value $\Delta t$. If, however, this lower limit value is not met in the detection of the actual value, this failure to meet the value is detected as a misfire, and appropriately processed, in the signal detection in the engine timing.

Figure 3:
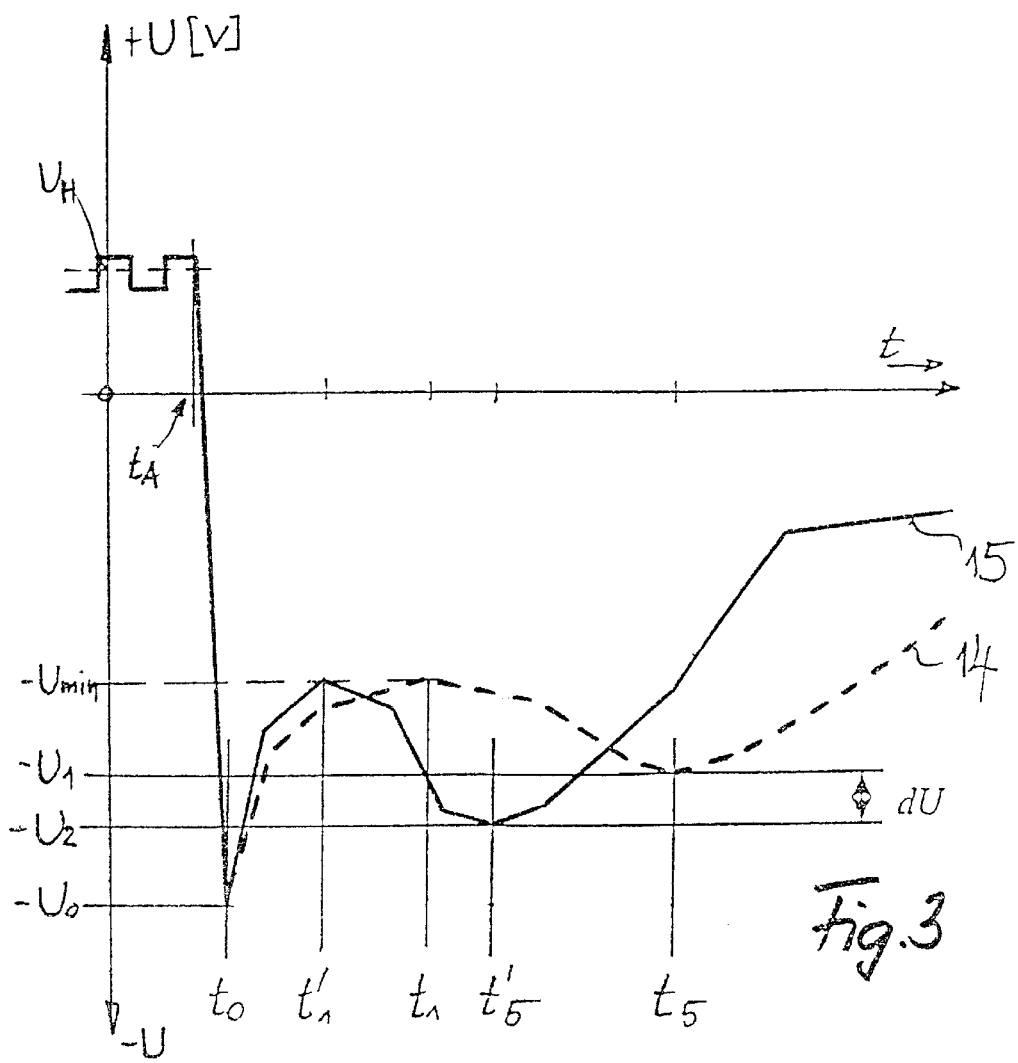
FIG. 3 illustrates the course of the voltage at the closing magnet during the opening process.

FIG. 3 illustrates the course of the voltage at the closing magnet 3 during the opening process, as described at the outset. The dashed-line curve 14 illustrates the voltage course during a normal combustion process as a function of time, while the solid-line curve 15 illustrates the voltage course as a function of time in the case of a misfire.

If, as described above, the cyclical retaining current is cut off at the closing magnet 3 at the time $t_A$, the voltage drops initially to the value $-U_0$, corresponding to the remanents of the system. As soon as the current has flown off to the extent that the opening spring 7 can overcome the force of the residual field at the time $t_1$, the armature 6 begins to move at the time $t_1$. Due to the electro-inductive influences between the moving armature and the residual magnetism in the electromagnet, the voltage rises again until the armature is far enough away that it can no longer exert an influence in the attenuating field, and the voltage eventually drops. This voltage maximum $-U_1$ occurs at a time $t_5$.

Because the armature is set in motion much earlier, specifically at time $t'_1$, when a misfire occurs, at this time the residual field in the electromagnet is significantly higher, and the electro-inductive influence of the moving armature is noticeably higher, so the voltage rise caused by the armature movement, with its maximum $U_2$, is significantly higher, and is attained at an earlier time, namely the time $t'_5$. After this time, the current drop is far more dramatic, because the armature moves away from the retaining magnet 3 much faster, as described in detail below.

As can be seen from FIG. 3, when a misfire occurs after the cutoff of the retaining current, the maximum $-U_2$ for the voltage rise is reached earlier, namely at the time $t'_5$. This maximum exceeds the minimum value $-U_1$, however, so a corresponding signal indicates a misfire when a preset minimum value for $-U_1$ as the nominal value is exceeded by an actual value according to $-U_2$.

When the misfire is recognized, a corresponding upper tolerance limit for the nominal value is predetermined over the voltage course based on the unavoidable fluctuations for the minimum value $-U_1$ that can be preset as the nominal value, so a misfire is not recognized until this nominal value is exceeded.

As indicated by the varying voltage course as a function of time during normal operation (curve 14), on the one hand, and in the event of a misfire (curve 15), on the other hand, the difference between $-U_{min}$ and $-U_1$ can be preset as a nominal-value presetting, in addition to the voltage difference between $-U_1$ and $-U_2$. If the actual value of the voltage difference between $-U_1$ and $-U_{min}$ is exceeded, and the difference value between $-U_2$ and $-U_{min}$ is attained, or example, a misfire can be assumed.

The detection of the time difference between $t_0$ and $t_5$ when the voltage maximum $-U_1$ is attained in normal operation, and the detection of the time difference between $t_0$ and $t'_5$ when the voltage maximum $-U_2$ has been attained, also offer the possibility of detecting a misfire.

The described movement curves corresponding to FIG. 2 and the voltage curves corresponding to FIG. 3 are always based on the assumption that the armature-cylinder valve system includes no play, which is the case if, for example, such a system is provided with an automatic valve-play compensation.

If the relevant actuator is not provided with an automatic valve-play compensation, the detection of the actual and nominal values by sensors is more practical, because the valve play advances the breakdown of the residual field required for the detection with respect to the voltage course so far that the differences in the curve courses in normal operation and the occurrence of misfires are no longer distinct enough for the derivation of a perfect measured value.

What is claimed is:

1. A method for recognizing misfires in a piston-type internal-combustion engine having spark ignition and an engine control unit for actuating electromagnetic actuators for operating the cylinder valves, said method comprising: determining an actual value from the time difference between the opening time preset as an actual value by the engine control unit and the actual opening time of an exhaust valve; comparing the determined actual value to a preset tolerance-time difference as a nominal value; generating a signal if the nominal value exceeds the actual value; and using a sensor associated with a movable part of the electromagnetic actuator connected to the exhaust valve to detect the actual start of the movement of the exhaust valve during the opening stroke.

2. A method for recognizing misfires in a piston-type internal-combustion engine having spark ignition and an engine control unit for actuating electromagnetic actuators for operating the cylinder valves, said method comprising: determining an actual value from the time difference between the opening time preset as an actual value by the engine control unit and the actual opening time of an exhaust valve; comparing the determined actual value to a preset tolerance-time difference as a nominal value; generating a signal if the nominal value exceeds the actual value; and detecting a change in a course of a voltage U at the closing magnet of the actuator of the gas-exhaust valve after the cutoff of a retaining current as a function of time; and releasing a signal if a preset minimum voltage value for the nominal value $U_1$ is exceeded.

3. The method according to claim 2, wherein instead of the presetting of a minimum voltage value, presetting a minimum voltage difference preset as the nominal value.

4. The method according to claim 1, further comprising detecting a change in a course of a voltage U at the closing magnet of the actuator of the gas-exhaust valve after the cutoff of a retaining current as a function of time; and releasing a signal if a preset minimum voltage value for the nominal value $U_1$ is exceeded.

5. The method according to claim 4, wherein instead of the presetting of a minimum voltage value, presetting a minimum voltage difference as the nominal value.

* * * * *